Figure 1:
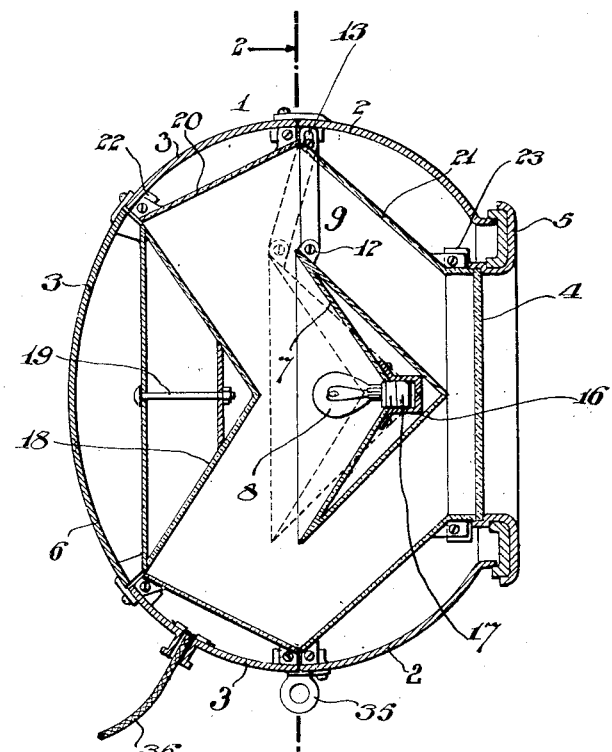

Oct. 9, 1928. 1,686,656
W. L. GEDDES
HEADLIGHT
Filed Feb. 17, 1927 2 Sheets-Sheet 1

Inventor:
William L. Geddes,
By [signature]
Attorney.

Oct. 9, 1928.

W. L. GEDDES

HEADLIGHT

Filed Feb. 17, 1927   2 Sheets-Sheet 2

1,686,656

Inventor:
William L. Geddes,
By
Attorney.

Patented Oct. 9, 1928.

1,686,656

UNITED STATES PATENT OFFICE.

WILLIAM L. GEDDES, OF MONTCLAIR, NEW JERSEY.

HEADLIGHT.

Application filed February 17, 1927. Serial No. 168,875.

My invention is an improved light projector or head-light for automobiles and the like and is designed to obviate or minimize the objectionable glare incident to automobile head-lights now in common use.

My invention relates more particularly to a head-light having its source of light entirely concealed from view through the transparent closure, and in which the transmission of the light from its source to and through the transparent closure, to form the desired beam, is effected entirely by a successive series of reflectors disposed at suitable angles to each other; the position of the source of light with respect to the reflectors and the positions of the several reflectors being adjustable so that the angles of incidence of the rays reflected from the various internal reflectors to the final reflector may be coordinated.

By my improvements and the consequent formation of the final beam from rays of reflected light instead of from direct rays from the source, objectionable glare is eliminated and minimized and the light is confined more nearly within the bounds of the projected main beam and excessive dispersion thereof is avoided.

My invention is preferably embodied in a suitable housing, open at the front end, having a suitable transparent closure mounted in the open front end thereof, and provided with a coaxially disposed primary reflector unit positioned within said housing and intermediate said closure and the rear of said housing, supported equidistantly from the housing by a plurality of thin radial blades.

The source of light, such as an electrical bulb is positioned behind the primary reflector, so as to prevent projection through the closure of direct rays of the lamp filament, and the interior of the housing is lined with a series of convex and concave secondary reflectors of generally conical shape and coaxially disposed, adapted to reflect forwardly the rays of light from the electric bulb, as well as from the primary reflector and to reflect the same through the transparent closure in front of the housing in a well defined beam.

The characteristic features and advantages of my improvements will more fully appear from the following description and the accompanying drawings in illustration of a preferred embodiment thereof.

In the accompanying drawings, in which like reference characters indicate like parts:—

Figure 2:
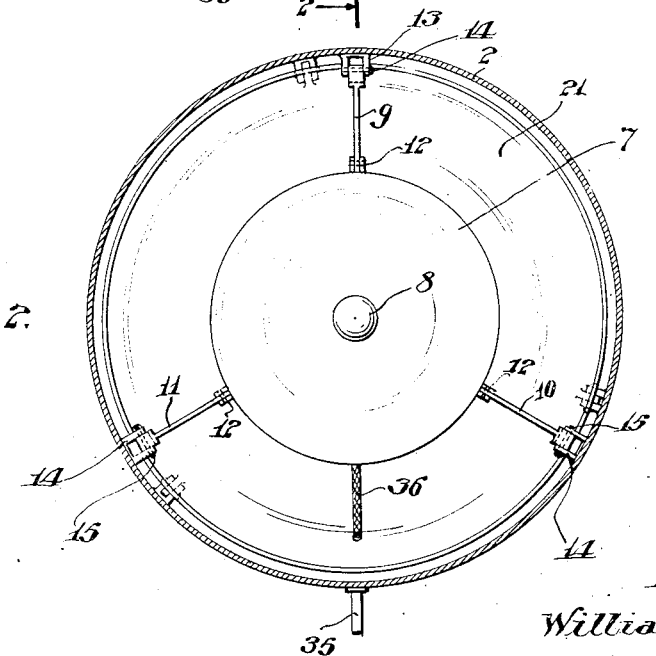
Figure 4:
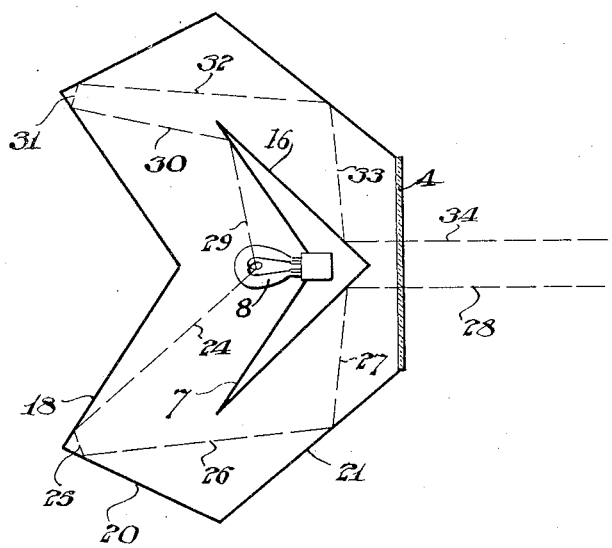
Figure 3:
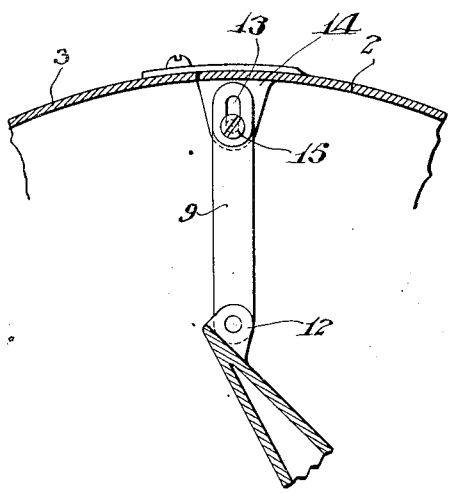

Figure 1 is a vertical sectional view of an automobile head-light embodying my invention; Fig. 2 is a vertical transverse section of the same taken on the line 2—2 of Fig. 1; Fig. 3 is a fragmentary detailed view on an enlarged scale of the reflector supports of my novel construction; and Fig. 4 is a diagrammatical illustration of the several reflecting surfaces and of the typical paths of reflected rays of light.

As illustrated in the drawings, my invention is embodied in an outer housing 1 of any suitable shape, such as the generally spherical shape shown, preferably formed of two halves 2 and 3 which may be secured to each other by any suitable means.

The transparent closure 4, which may be of any desired contour and refractive properties, is mounted in the front open end of the housing 1, and secured in place by a suit-rim or lens holder 5. The rear half 3 of the housing 1 is preferably provided with a rear door or closure 6, secured thereto by any suitable means.

The primary reflector 7, of suitable concave shape, such as the conical form shown in the drawing, is provided with a central recess containing a socket 17 for the base of the electric bulb 8, and is supported coaxially and in spaced relation to the housing 1 by means of a plurality of radial supporting blades 9, 10 and 11. The inner ends of the blades 9, 10 and 11, are pivotally secured to the peripheral rim 12 of the primary reflector 7. The outer ends thereof are provided with the slightly elongated openings 13, and are adjustably secured to the brackets 14 by means of a series of set screws 15, extending through the elongated openings 13 and the brackets 14. The brackets 14 are rigidly and permanently secured to the inner surface or wall of the housing member 3.

By this novel supporting means, the primary reflector 7 is rigidly supported within the housing, spaced from the same and adjustable along the longitudinal axis of said housing with respect to the secondary reflectors hereinafter described.

A convex reflector or projector 16, preferably of conical shape, and having a somewhat more acute apex than the primary reflector 7 is secured to the back of the latter so that the walls of the primary reflector 7 and the final reflector or projector 16 converge adjacent to the peripheral edges thereof. The reflectors 7 and 16 may be formed integral or be secured together at their peripheral edges.

A convex secondary reflector 18 of any suitable form, such as the conical shape shown in the drawings, is secured to the rear closure 6, by means of the bolt 19, or any other suitable means.

Within each of the halves 2 and 3 of the housing 1, I mount corresponding and somewhat similar conical concave secondary reflectors 20 and 21 respectively, converging in opposite directions, and either permanently or detachably secure to the interior of the housing members 2 and 3 by supporting lugs 22 and 23. The juxtaposed edges of the concave reflectors 20 and 21 abut each other to form continuous inner reflecting surfaces, the rear edge of the reflector 20 terminates adjacent to the reflector 18 and the front edge of the reflector 21 is provided with a small cylindrical flange projecting outwardly toward and preferably contacting with the transparent closure 4. Each of the reflectors 7, 18, 20 and 21 is highly polished, while the final reflector or projector 16 may be silvered dull or slightly pebbled to eliminate any glare therefrom.

Fig. 4 illustrates in a diagrammatic manner the relation of the several reflecting surfaces to the transparent closure and also illustrates two typical paths of reflected rays of light, from the source of illumination to the transparent closure. For instance a ray of light 24 emanating from the electric bulb 8 and impinging directly upon the reflector 18 is reflected onto the reflector 20 along the path 25, and from thence it is reflected along the path 26, onto the reflector 21. The reflector 21 in turn reflects the ray of light along the path 27 onto the final reflector or projector 16, from which it is again reflected along the line 28, out through the transparent closure 4. Similarly a ray of light 29 emanating from the source 8 and impinging upon the primary reflector 7, is reflected along the line 30 onto the reflector 18, and from the reflector 18 onto the reflector 20 along the line 31. From the reflector 20, it is reflected onto the second conical reflector 21 along the line 32, from whence it is reflected along the line 33 onto the final reflector or projector 16.

From the projector 16, the ray of light is again projected out through the transparent closure along the line 34.

While the repeated reflections of the rays of light entail a certain amount of loss of light, such loss is more than compensated for by the concentration of the finally projected rays of light within a well defined beam, instead of scattering the projected light in all directions. The effective light, thus projected out through the closure 4, by the novel construction of my invention, is probably equal to or in excess of the amount of effective light projected directly from an exposed bulb of the same candle power of headlights now in common use.

The headlight may be supported or carried by means of suitable supporting lugs or brackets 35 and supplied with current for the lamp through the cord 36.

Having described my invention, I claim:

1. A light projector comprising a source of light, reflecting means having a concave reflecting surface and a convex reflecting surface, said reflecting means forming a shield preventing direct projection from said projector of light rays generated by said source, reflecting means having a convex reflecting surface to which light rays are projected from said source of light and said concave reflecting surface, and reflecting means by which rays from said second named convex reflecting surface are projected upon said first named convex reflecting surface, said first named convex reflecting surface projecting a beam from said projector.

2. A light projector comprising a source of light surrounded by reflecting means having a concave reflecting surface and a convex reflecting surface, said means forming a shield preventing direct projection from said projector of light rays generated by said source, reflecting means having a reflecting surface toward which light rays are transmitted from said source and said concave reflecting surface, and reflecting means to which rays are reflected by said second named reflecting means and by which rays are reflected to the convex reflecting surface of the first named reflecting means, said first named and third named reflecting means preventing direct projection from said projector of rays from said second named reflecting means.

3. A light projector comprising a source of light, reflecting means surrounding and having a fixed relation to said source of light, said reflecting means having a concave reflecting surface and a convex reflecting surface, said means forming a shield preventing direct projection from said projector of light rays generated by said source, reflecting means having a convex reflecting surface toward which light rays are transmitted from said source and said concave reflecting surface and toward and from which said source of light and reflecting means first named are adjustable, means for adjusting the source of light and reflecting means first named toward and from the convex reflecting surface of the reflecting means second named, and reflecting means to which rays are reflected by said second named reflecting means, and by which rays are reflected to the convex reflecting surface of the first named reflecting means, said first named convex reflecting surface projecting a beam from said projector.

4. A light projector comprising a lamp, reflecting means having said lamp seated in the axis thereof and having a concave reflecting surface surrounding said lamp and a convex reflecting surface, said means forming a shield preventing direct projection from said projector of light rays generated by said lamp, reflecting means having a convex reflecting surface of greater diameter than said concave reflecting surface to which light rays are transmitted from said lamp and concave reflecting surface, and reflecting means surrounding said reflecting means first and second named and having an edge adjacent to the edge of said second named reflecting means and another edge forming an aperture of less diameter than said reflecting means second named and through which a beam is projected by the convex reflecting surface of said reflecting means first named.

5. In a light projector of the character described, a pair of oppositely converging concave reflectors, a transparent closure disposed coaxially with respect thereto, a reflecting unit disposed within said concave reflectors in spaced relation thereto and spaced from and of diameter not less than said closure, said unit comprising a concave primary reflector, a convex reflector juxtaposed to said closure, and a source of light within said primary reflector and extending rearwardly therefrom, the rays of light from said source being projected through the closure only by a successive series of reflections.

6. In a light projector of the character described, a housing having an open end with a transparent closure mounted therein, a primary reflecting unit supported within said housing in spaced relation thereto, a series of radial supports pivotally secured to said primary reflecting unit and pivotally and adjustably secured to said housing, a pair of oppositely converging concave internal reflectors surrounding said unit and spaced therefrom; said primary reflecting unit comprising a rearwardly reflecting primary reflector, and a forwardly reflecting final reflector juxtaposed to said closure; a source of light positioned behind said primary reflector, and a reflector to which light is reflected from said source by said rearwardly reflecting primary reflector and by which light is reflected toward said concave reflectors.

7. A light projector of the character described comprising a transparent closure, an axially disposed source of light, a coaxially disposed primary reflector disposed in operative relation to said source of light intermediate the same and said closure and entirely shielding the latter from the former, a convex reflector in coaxial alignment with and of greater diameter than said primary reflector and angularly disposed coaxially reflecting surfaces adjacent to said source of light and said primary reflector and operatively interposed between said primary reflector and said transparent closure, and adapted to reflect rays of light from said source of light as well as from said primary reflector through said closure.

8. In a light projector of the character described, a pair of oppositely converging conical concave reflectors, a transparent closure disposed coaxially with respect thereto, at the end of one of said conical reflectors, a reflector positioned at the opposed end of the other of said conical reflectors, a primary reflecting unit disposed within said conical concave reflectors in spaced relation thereto and spaced from said closure, said unit comprising a conical concave rearwardly projecting primary reflector, a conical convex final reflector juxtaposed to said closure, and a source of light carried within said primary reflector and extending rearwardly therefrom, whereby the rays of light from said source will be passed through the closure only by a successive series of reflections.

In testimony whereof I have hereunto set my name this 15th day of February, 1927.

WILLIAM L. GEDDES.